United States Patent [19]
Bosse, Jr.

[11] Patent Number: 5,578,791
[45] Date of Patent: Nov. 26, 1996

[54] COMBINED WALL MOUNT AND ELECTRICAL OUTLET BOX

[76] Inventor: John J. Bosse, Jr., 56 Ivy Way, Lancaster, N.Y. 14086

[21] Appl. No.: 241,764

[22] Filed: May 12, 1994

[51] Int. Cl.⁶ ........................................ H02G 3/10
[52] U.S. Cl. ............................. 174/48; 174/65 R
[58] Field of Search ..................... 52/28, 60, 62; 174/48, 65 R; 248/205.1; 362/147, 432

[56] References Cited

U.S. PATENT DOCUMENTS

| | | | |
|---|---|---|---|
| 1,484,001 | 2/1924 | Ainsworth . | |
| 4,222,093 | 9/1980 | Garcia et al. | 362/147 |
| 4,635,168 | 1/1987 | Crowley | 562/147 |
| 4,724,281 | 2/1988 | Nix et al. | 174/65 R X |
| 4,726,152 | 2/1988 | Vagedes et al. | 52/28 |
| 4,920,708 | 5/1990 | MacLeod et al. | 52/60 |
| 4,920,709 | 5/1990 | Garries et al. | 52/85 |
| 4,922,056 | 5/1990 | Larsson | 174/65 R |
| 5,000,409 | 3/1991 | MacLeod et al. | 248/205 |
| 5,287,665 | 2/1994 | Rath, Jr. | 174/48 X |
| 5,397,093 | 3/1995 | Chubb et al. | 248/544 |
| 5,448,011 | 9/1995 | Laughlin | 174/48 |

OTHER PUBLICATIONS

Brochure entitled "Zip Box Blue Nonmetallic Switch And Outlet Boxes" 18 pages, ©Carlon 1992.

*Primary Examiner*—Kristine L. Kincaid
*Assistant Examiner*—Dean A. Reichard
*Attorney, Agent, or Firm*—Joseph P. Gastel

[57] ABSTRACT

A combined wall mount and electrical outlet box unit for mounting on a wall surface including a molded plastic combination of a housing having side walls and a front wall, flanges having inner edges proximate the housing and extending outwardly from the side walls, spaced inner walls formed integrally with the insides of certain of the side walls and the front wall to define an electrical outlet box, an opening in the front wall between the inner walls leading to a chamber in the interior of the electrical outlet box, a plate sealed across the inner edges of the flanges for enclosing the rear side of the housing, and openings in the plate for receiving wires leading into the chamber of the electrical outlet box.

31 Claims, 2 Drawing Sheets

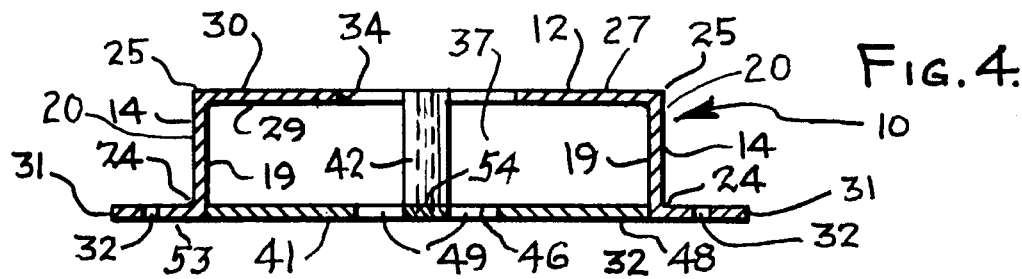
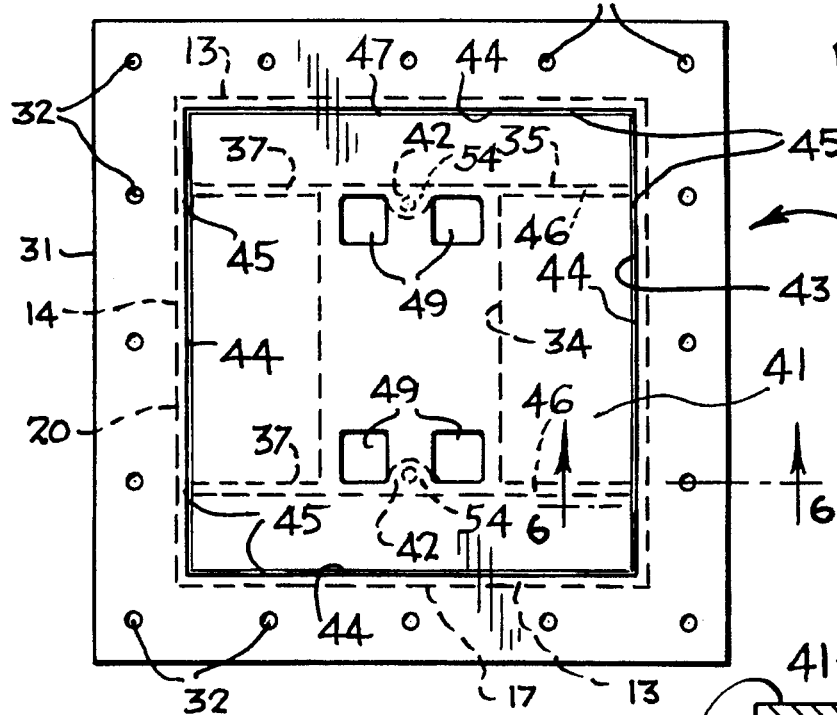
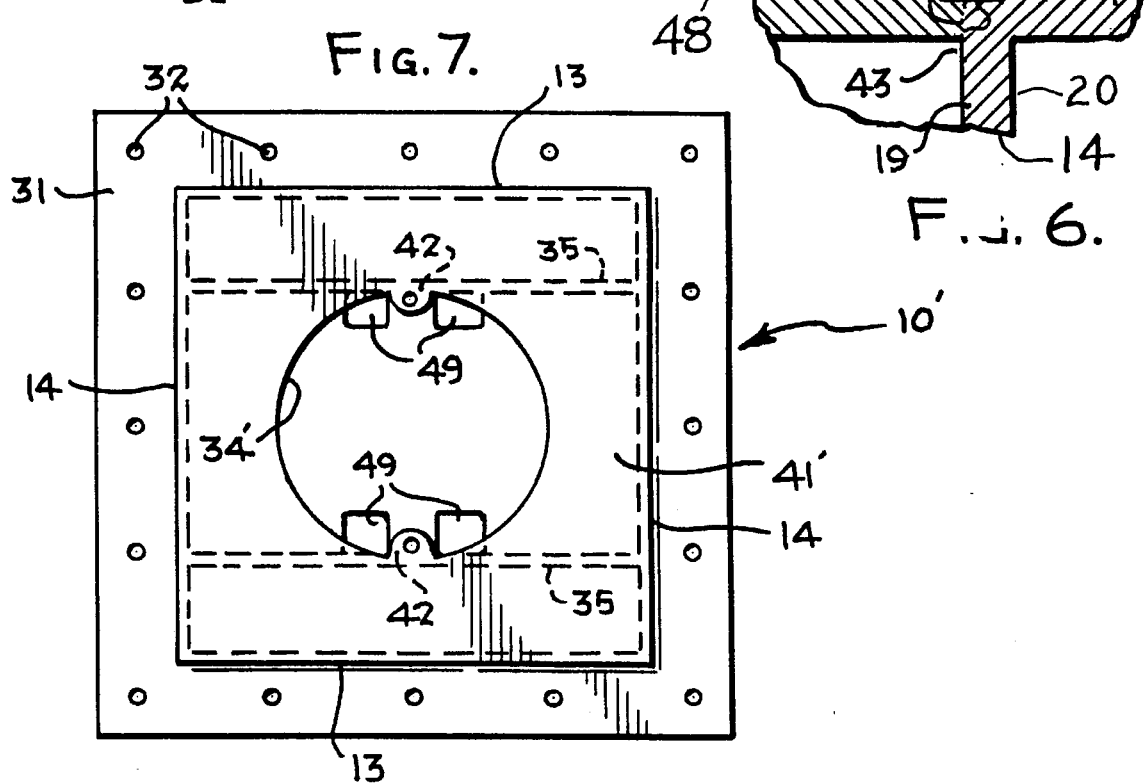

COMBINED WALL MOUNT AND ELECTRICAL OUTLET BOX

BACKGROUND OF THE INVENTION

The present invention relates to a combined wall mount and electrical outlet box unit.

By way of background, in the past wall mounts having the general outer configuration shown in FIG. 1 of the drawings were supplied with a solid front wall having score marks thereon. In use, the installer had to cut out an opening in the shape of the perimeter of the electrical outlet box from the front wall. However, this was a time-consuming and tedious task because the wall mounts were fabricated of tough polyethylene plastic or metal. Thereafter, a separate conventional electric outlet box was slid into the opening which was cut out in the wall mount. This outlet box was of conventional shape, and, as noted above, it had an outer perimeter which was the size of the opening which was cut into the face of the wall mount. There were no connections between the wall mount and the electrical outlet box other than the contact therebetween at the cutout portion in the face of the wall mount.

SUMMARY OF THE INVENTION

It is one object of the present invention to provide a combined wall mount and electrical outlet box unit wherein the electrical outlet box is an integral portion of the wall mount, thereby obviating the necessity to cut the front wall of the wall mount for receiving an electrical outlet unit box.

Another object of the present invention is to provide a combined wall mount and electrical outlet box unit wherein the electrical outlet box portion is much larger than the separate outlet box which was previously installed into the separate wall mount.

A further object of the present invention is to provide an improved one-piece wall mount and electrical outlet box unit wherein the electrical outlet box portion is firmly secured to the wall mount because it is an integral molded part thereof.

Yet another object of the present invention is to provide a combined wall mount and electrical outlet box unit which has a rear wall which is flush with the mounting flange thereof and which serves as an enclosing portion of the electrical outlet box. Other objects and attendant advantages of the present invention will readily be perceived hereafter.

The present invention relates to a combined wall mount and electrical outlet box unit for mounting on a surface comprising a housing, a plurality of opposed side walls on said housing, inner and outer sides on said side walls, inner and outer edges on said side walls, a front wall connected to said outer edges of each of said side walls and extending inwardly therefrom toward other outer edges of said opposed side walls, mounting flange means connected to said inner edges of said side walls and extending outwardly therefrom away from said outer sides of said side walls for securing said unit on a surface, an opening in said front wall, box means defining a chamber for receiving wires, front and rear edges on said box means, said front edges being secured to said front wall with said chamber being accessible through said opening, said rear edges of said side walls defining a second opening, a plate secured across said second opening, and third openings in said plate for receiving wires which pass into said chamber defined by said box means.

The various aspects of the present invention will be more fully understood when the following portions of the specification are read in conjunction with the accompanying drawings wherein:

BRIEF DESCRIPTION OF THE DRAWINGS

FIG. 4 is a cross sectional view taken substantially along line 4—4 of FIG. 2;

FIG. 5 is a rear elevational view of the combined wall mount and electrical outlet box unit;

FIG. 6 is an enlarged fragmentary cross sectional view taken substantially along line 6—6 of FIG. 5 and showing the manner in which the back plate is secured to the rear side of the combined wall mount and electrical outlet box unit; and FIG. 7 is a front elevational view of a modified embodiment of the combined wall mount and electrical outlet box unit.

DESCRIPTION OF THE PREFERRED EMBODIMENTS

Figure 1:
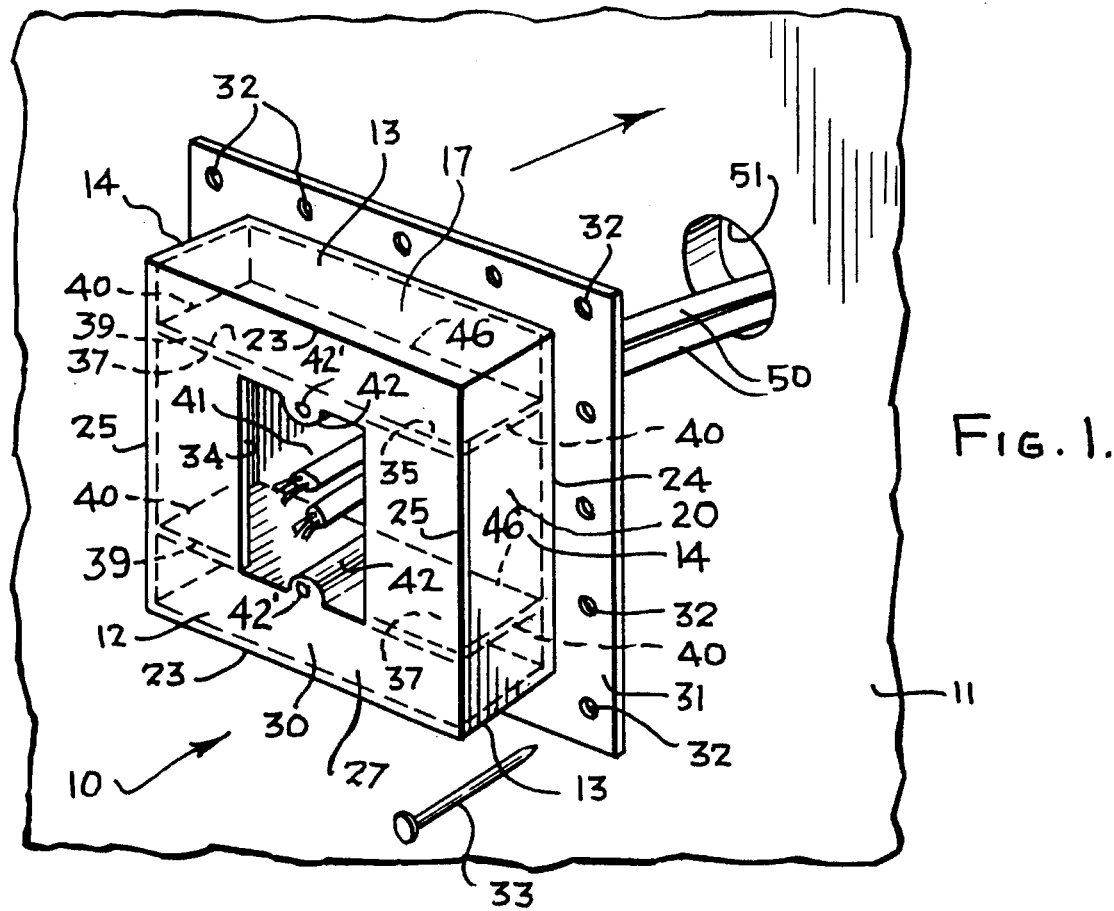
FIG. 1 is a perspective view of the one-piece combined wall mount and electrical box unit located relative to a wall onto which it is to be mounted.
Figure 2:
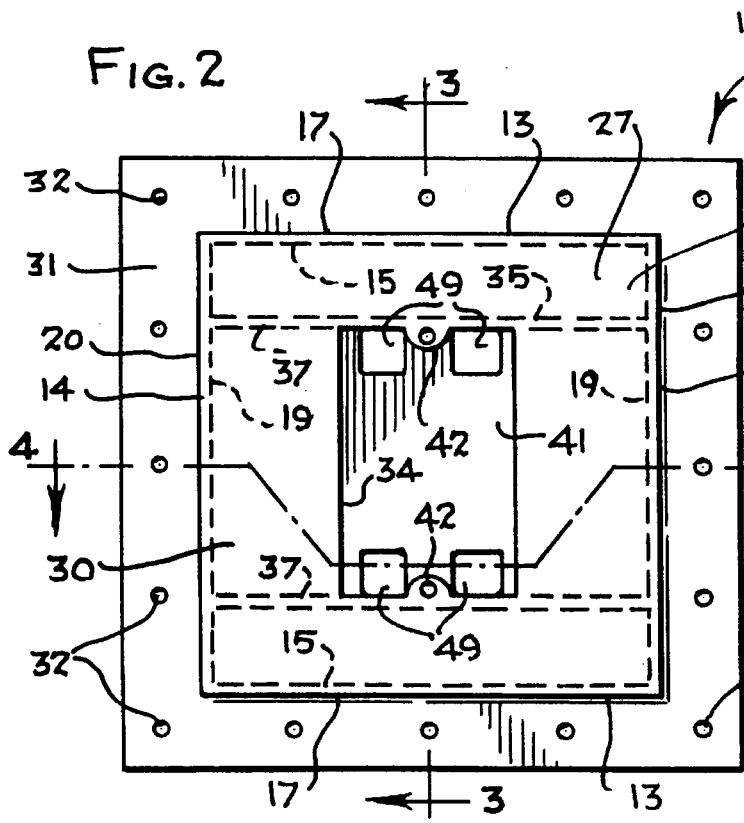
FIG. 2 is a front elevational view of the combined wall mount and electrical outlet box unit.
Figure 3:
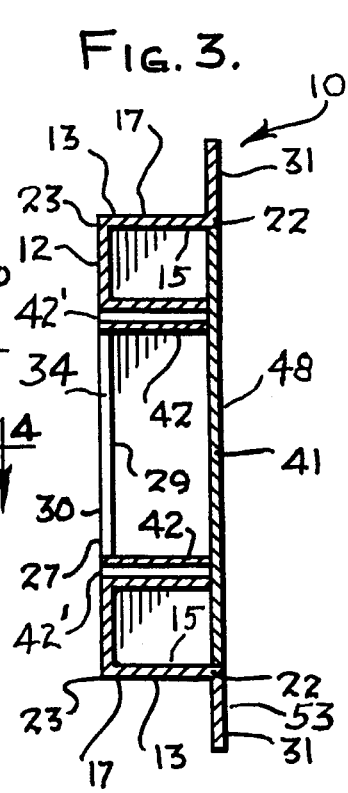
FIG. 3 is a cross sectional view taken substantially along line 3—3 of FIG. 2.

In FIG. 1 the improved combined wall mount and electrical outlet box unit 10 is shown in the process of being mounted relative to a wall 11 of a building. Wall 11 may be an external wall or an internal wall of wood or masonry. The unit 10 includes a housing 12 consisting of a plurality of walls which includes a pair of opposed side walls 13 and a pair of opposed side walls 14. In the present instance walls 13 and 14 are all of equal length. Walls 13 have inner sides 15 and outer sides 17. Walls 14 have inner sides 19 and outer sides 20. Walls 13 have inner edges 22 and outer edges 23. Walls 14 have inner edges 24 and outer edges 25. The front wall 27 is connected across the outer edges 23 and 25 of the side walls 13 and 14, respectively. Front wall 27 includes an inner surface 29 and an outer surface 30. A mounting flange 31 extends outwardly from the inner edges 22 and 24 of side walls 13 and 14, respectively. Spaced apertures 32 are located in mounting flange 31 for receiving fasteners, such as nails 33, for securing the mounting flange relative to wall 11, or the mounting flange 31 may be secured to wall 11 by glue. An opening 34 is located in front wall 30.

An electrical outlet box 35 is formed integrally within housing 12 by a pair of spaced inner walls 37 which have front edges 39 (FIG. 1) secured to front wall 27 and they have side edges 40 secured to side walls 14. Thus, electrical outlet box portion 35 is bounded by walls 37 and portions of side walls 14 which lie between walls 37. By virtue of this construction, the outlet box portion 35 is much larger than a conventional outlet box wherein the side walls would extend rearwardly from the edges of opening 34 in front wall 27. This permits box 35 to accommodate greater amounts of wires. Elongated tubular members 42 are molded integrally with the inner walls 37 and have bores 42' therein for receiving fasteners, such as screws (not shown), for securing an external member, such as a cover plate or a light fixture or a switch or a plug across opening 34. At this point it is to be noted that all of the above-described non-metallic structure is molded from suitable plastic, such as polyethylene, as an integral unit.

To complete the combined wall mount and electrical outlet box unit 10, a rear plate or wall 41 is placed into an opening 43 (FIG. 5) which is defined by the inner edges 44 of flange 31. Plate 41 bears against rear edges 46 of box walls 37 and the ends 54 of tubular members 42. This causes box 35 to be completely closed except for the opening 34 in front wall 27 and except for the openings 49 in the-plate 41. Plate 41 is secured in opening 43 by a PVC heat weld or bond at 45 between the entire edge 47 of plate 41 and the entire contiguous edge 44 of flange 31, to thereby provide a seal therebetween against the passage of foreign matter into box 35, especially water. The rear surface 48 of wall 41 is substantially coplanar with the rear surface 53 of flange 31 so that the rear of unit 10 will fit flush against building wall 11. The openings 49 are provided in plate 41 for receiving wires, such as 50, which are passed into box 35 after having passed through opening 51 in building wall 11.

After the unit 10 has been mounted on wall 11, the entire outer edge of flange 31 is preferably caulked prior to the application of siding to wall 11.

A modified embodiment 10' of the combined wall mount and electrical outlet box unit is shown in FIG. 7. The unit 10' of FIG. 7 is identical in all respects to the embodiment of FIGS. 1–6 except that the front wall 41' is different in that it has a circular opening 34' rather than the rectangular opening 34 of the previous figures.

It is to be noted that while the unit 10 is shown in FIGS. 1–5 with the opening 34 having its lengthwise dimension oriented vertically, it can be mounted with its lengthwise direction horizontally.

It can thus be seen that the combined wall mount and electrical outlet box units of the present invention are manifestly capable of achieving the above-enumerated objects, and while preferred embodiments of the present invention have been disclosed, it will be appreciated that they are not limited thereto but may be otherwise embodied within the scope of the following claims.

What is claimed is:

1. A plastic electrical wall mount unit for mounting on a surface comprising a housing, a plurality of side walls on said housing, inner and outer sides on said side walls, inner and outer edges on said side walls, a front wall molded integrally with said side walls proximate said outer edges of said side walls and extending inwardly therefrom toward other of said side walls, a flange molded integrally with said side walls proximate said inner edges of said side walls and extending outwardly away from said outer sides of said side walls, a preformed opening in said front wall, and fastener-receiving members secured within and in spaced relationship to said side walls.

2. A plastic electrical wall mount unit as set forth in claim 1 including a rear wall mounted on said housing in opposition to said front wall and secured proximate said inner edges of said side walls.

3. A plastic electrical wall mount unit as set forth in claim 2 including a third opening in said rear wall.

4. A plastic electrical wall mount unit as set forth in claim 3 including a box comprising a plurality of box walls within said housing.

5. A plastic electrical wall mount unit as set forth in claim 4 wherein said box walls are molded integrally with said front wall.

6. A plastic electrical wall mount unit as set forth in claim 5 wherein said box walls are also molded integrally with said side walls.

7. A plastic electrical wall mount unit as set forth in claim 6 wherein said fastener-receiving members are molded integrally with said box walls.

8. A plastic electrical wall mount unit as set forth in claim 2 including a box comprising a plurality of box walls within said housing.

9. A plastic electrical wall mount unit as set forth in claim 8 wherein said box walls are molded integrally with said front wall.

10. A plastic electrical wall mount unit as set forth in claim 9 including rear edges on said box walls, and wherein said rear wall bears against said rear edges.

11. A plastic electrical wall mount unit as set forth in claim 9 wherein said box walls are also molded integrally with said side walls.

12. A plastic electrical wall mount unit as set forth in claim 11 including rear edges on said box walls, and wherein said rear wall bears against said rear edges.

13. A plastic electrical wall mount unit as set forth in claim 11 wherein said fastener-receiving members are molded integrally with said box walls.

14. A plastic electrical wall mount unit as set forth in claim 13 including rear edges on said box walls, and wherein said rear wall bears against said rear edges.

15. A plastic electrical wall mount unit as set forth in claim 2 including at least one box wall molded integrally with said front wall, a rear edge on said box wall, and wherein said rear wall bears against said rear edge of said box wall.

16. A plastic electrical wall mount unit as set forth in claim 15 wherein said box wall is also molded integrally with at least one of said side walls.

17. A plastic electrical wall mount unit as set forth in claim 1 including a box comprising a plurality of box walls within said housing.

18. A plastic electrical wall mount unit as set forth in claim 17 wherein said box walls are molded integrally with said front wall.

19. A plastic electrical wall mount unit as set forth in claim 18 wherein said box walls are also molded integrally with said side walls.

20. A plastic electrical wall mount unit as set forth in claim 19 wherein said fastener-receiving members are molded integrally with said box walls.

21. A plastic electrical wall mount unit as set forth in claim 1 including a box comprising a plurality of box walls within said housing, and wherein said fastener-receiving members are molded integrally with said box walls.

22. A plastic electrical wall mount unit as set forth in claim 21 wherein said box walls are molded integrally with said front wall.

23. A plastic electrical wall mount unit as set forth in claim 22 wherein said box walls are also molded integrally with said side walls.

24. A plastic electrical wall mount unit as set forth in claim 1 wherein said fastener-receiving members are molded integrally with said front wall.

25. A plastic electrical wall mount unit as set forth in claim 24 including a rear wall mounted on said housing in opposition to said front wall and secured proximate said inner edges of said side walls.

26. A plastic electrical wall mount unit as set forth in claim 25 including a third opening in said rear wall.

27. A plastic combined wall mount and electrical outlet box unit comprising a housing, a plurality of side walls on said housing, inner and outer sides on said side walls, inner and outer edges on said side walls, a front wall molded integrally with said side walls proximate said outer edges of said side walls and extending inwardly therefrom toward other of said side walls, and a box within said housing, said box being formed by a plurality of box walls, a preformed opening in said front wall for providing access to the inside of said box, front and rear edges on said box walls with at least said front edges molded integrally with said front wall on opposite sides of said opening.

28. A plastic combined wall mount and electrical outlet box unit as set forth in claim 27 wherein said box walls also have side edges molded integrally with said side walls.

29. A plastic combined wall mount and electrical outlet box unit as set forth in claim 28 including a rear wall mounted on said housing in opposition to said front wall and secured proximate said inner edges of said side walls.

30. A plastic combined wall mount and electrical outlet box unit as set forth in claim 27 including at least one opening in said rear wall.

31. A plastic electrical wall mount unit for mounting on a surface comprising a housing, a plurality of side walls on said housing, inner and outer sides on said side walls, inner and outer edges on said side walls, a front wall molded integrally with said side walls proximate said outer edges of said side walls and extending inwardly therefrom toward other of said side walls, a preformed opening in said front wall, and fastener-receiving members molded integrally with said front wall.

* * * * *

UNITED STATES PATENT AND TRADEMARK OFFICE
CERTIFICATE OF CORRECTION

PATENT NO. : 5,578,791
DATED : November 26, 1996
INVENTOR(S) : John J. Bosse, Jr.

It is certified that error appears in the above-indentified patent and that said Letters Patent is hereby corrected as shown below:

Column 6, line 2 (claim 30), change "27" to --29--.

Signed and Sealed this

Fourth Day of March, 1997

Attest:

BRUCE LEHMAN

*Attesting Officer*     *Commissioner of Patents and Trademarks*